US006401518B1

(12) United States Patent
O'Keeffe et al.

(10) Patent No.: US 6,401,518 B1
(45) Date of Patent: Jun. 11, 2002

(54) FLUID FILLED ELECTRICAL DEVICE WITH DIAGNOSTIC SENSOR LOCATED IN FLUID CIRCULATION FLOW PATH

(75) Inventors: Thomas G. O'Keeffe, Farmington, CT (US); Steven H. Azzaro, Schenectady, NY (US); Vinay B. Jammu; Edward B. Stokes, both of Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/362,866

(22) Filed: Jul. 29, 1999

(51) Int. Cl.[7] ............................ H01F 27/12; G01N 7/00

(52) U.S. Cl. ...................... 73/19.01; 73/19.1; 73/61.41; 73/61.76; 73/61.78; 73/61.79; 73/73

(58) Field of Search .............................. 73/19.01, 19.1, 73/61.41, 61.76, 61.79, 61.78, 73

(56) References Cited

U.S. PATENT DOCUMENTS

| | | | | |
|---|---|---|---|---|
| 3,680,359 A | | 8/1972 | Lynch | |
| 3,844,160 A | | 10/1974 | Yamaoka | |
| 3,866,460 A | | 2/1975 | Pearce, Jr. | |
| 4,058,373 A | | 11/1977 | Kurz et al. | |
| 4,112,737 A | | 9/1978 | Morgan | |
| 4,236,404 A | | 12/1980 | Ketchum et al. | |
| 4,337,820 A | * | 7/1982 | Pierce | 73/73 |
| 4,402,211 A | | 9/1983 | Sugawara et al. | |
| 4,444,040 A | | 4/1984 | Sakai et al. | |
| 4,456,899 A | | 6/1984 | Matthes et al. | 336/55 |
| 4,654,806 A | | 3/1987 | Poyser et al. | 340/521 |
| 4,763,514 A | | 8/1988 | Naito et al. | |
| 4,823,224 A | | 4/1989 | Hagerman et al. | |
| 4,890,478 A | | 1/1990 | Claiborne et al. | |
| 4,944,178 A | | 7/1990 | Inoue et al. | |
| 5,062,092 A | | 10/1991 | Siryj et al. | |
| 5,127,962 A | | 7/1992 | Inoue et al. | |
| 5,192,174 A | | 3/1993 | Hartmann | |
| 5,257,528 A | | 11/1993 | Degouy et al. | |
| 5,461,367 A | * | 10/1995 | Altavela et al. | 340/584 |
| 5,492,014 A | | 2/1996 | Hazony | 73/644 |
| 5,612,930 A | | 3/1997 | Hazony et al. | |
| 5,773,709 A | | 6/1998 | Gibeault et al. | 73/25.01 |
| 6,156,978 A | * | 12/2000 | Peck et al. | 174/151 |

FOREIGN PATENT DOCUMENTS

| | | |
|---|---|---|
| WO | WO 45673 | 10/1998 |

OTHER PUBLICATIONS

Patent Abstracts of Japan, vol. 9; No. 193 (E–334), Aug. 9, 1985 & JP 60–062103 A (Meidensha KK), Apr. 10, 1985.

Patent Abstracts of Japan, vol. 1998, No. 03, Feb. 27, 1998 & JP 09–306743 A (Mitsubishi Electric Corp.), Nov. 28, 1997.

* cited by examiner

*Primary Examiner*—Daniel S. Larkin
(74) *Attorney, Agent, or Firm*—Hunton & Williams; Kevin T. Duncan, Esq.

(57) ABSTRACT

A fluid filled transformer including a tank for containing at least primary and secondary windings, a radiator connected to the tank via top and bottom headers, a fluid disposed in the tank, a fluid circulation flow path including passages through the windings, radiator, headers, and at least a portion of the tank, and at least one diagnostic sensor disposed within the fluid circulation flow path for measuring properties of the fluid. By positioning the sensor within the circulation flow path, measured values are more reliable, accurate, and efficiently sensed.

32 Claims, 2 Drawing Sheets

Fig. I

FLUID FILLED ELECTRICAL DEVICE WITH DIAGNOSTIC SENSOR LOCATED IN FLUID CIRCULATION FLOW PATH

BACKGROUND OF THE INVENTION

The present invention relates to a structure for monitoring the characteristics of a fluid filled device, and, more particularly, to placing a diagnostic sensor within a fluid circulation flow path of the device and thereby obtain faster and more representative indication of an observable event.

To reduce the cost of maintaining, for example, a high or medium voltage electrical transformer, it is known to monitor certain operating characteristics of the transformer, whereby in the event an anomaly is detected, the transformer can be taken off-line (if necessary) and/or repaired as necessary. Properties that tend to indicate potential problems with a transformer and which may be monitored include the temperature of the tank in which the transformer is housed or the temperature of a coolant/insulating fluid, typically oil, disposed in the tank. Another monitored property is a gas concentration in the fluid or oil. Gases that provide diagnostic clues to a transformer's state include hydrogen, methane, ethane, ethylene, carbon monoxide, carbon dioxide, acetylene, propane, and/or propylene. Other monitored transformer characteristics include moisture content, dielectric strength of the oil, and power factor values. When the measured or monitored value of any one or more of these properties exceeds predetermined levels, the transformer either likely is already operating in a fault mode, or will soon enter such a fault mode. Accordingly, such a transformer may be taken off-line (if necessary) and/or repaired. Generally, changes in monitorable properties that tend to indicate a transformer's overall "health" can be described as observable events.

Conventionally, sensors for monitoring the above-mentioned characteristics or properties of the fluid in a tank are mounted at existing external ports on the tank, such as drain valves or pressure relief means. Such an approach takes advantage of preexisting accesses to the tank of the transformer where fluid is easily accessible. Another known approach to sensing fluid properties is to locate a sensor at the top oil level in the tank via an internal mounting scheme. U.S. Pat. No. 3,680,359 to Lynch is an example of such an approach. Still another known approach is to provide a separate access hole or port in the tank and therefrom draw out an amount of fluid, or oil, considered sufficient to operate a sensor that is mounted external to the tank. Examples of this approach are disclosed in, for example, U.S. Pat. No. 4,058,373 to Kurz et al., U.S., Pat. No. 3,866,460 to Pearce, Jr., and U.S. Pat. No. 5,773,709 to Gibeault et al.

All of the approaches discussed above, however, position the sensor in a location that does not result in optimum detection by the sensor of the observable event. That is, conventional monitoring approaches are inaccurate to the extent that the monitoring is performed on fluid or oil that is drawn from a region adjacent to a tank wall or is near the top level of the fluid in the tank. Since the fluid in these regions tends to be more stagnant compared to fluid in other regions of the tank, the sample that is monitored might not accurately represent or indicate the manifestations of an observable event.

SUMMARY OF THE INVENTION

The preferred embodiment is directed to improving transformer diagnostic capability and reliability by selecting an appropriate sensor and locating that sensor, or a plurality thereof in the circulation flow path, i.e., the fluid circulation loop, of the electrical device. By positioning the sensor in such a way, an observable event can more effectively be witnessed and sensed by a sensor, thereby leading to more reliable, accurate, and timely measurements of observable events.

In the context of the present invention, the fluid circulation flow path is defined as a semi-closed loop where if an event occurs at a location in the loop, then all other sequential downstream locations will, in all likelihood, "witness" that event with some time delay.

In accordance with exemplary embodiments of the present invention, one or more sensors are positioned such that the fluid that is being sensed travels within the circulation flow path, whereby more accurate and efficient measurement of the properties and characteristics of that fluid can be obtained. In one embodiment, a sensor preferably is positioned in a radiator, or top or bottom radiator headers of the transformer. In another embodiment, a sensor preferably is disposed inside the transformer tank adjacent an inlet to or outlet from the radiator headers.

In a third embodiment, one or more sensors are positioned within the transformer windings. In this instance, the sensor preferably is wound together with the windings during manufacturing.

In a fourth embodiment, a sensor preferably is mounted on an end of a probe whose other end is disposed with the windings of the transformer. Such an approach reduces the sensor's susceptibility to electromagnetic interference.

In a fifth embodiment, a sensor is positioned adjacent to the inlets or outlets of the flow channels of the windings.

In a sixth embodiment, multiple sensors are positioned within the circulation flow path and an observable event is monitored by some or all of these sensors whereby a time analysis of the observable event is effected.

In all cases, the sensor preferably is positioned within the circulation flow path of the fluid circulating in the transformer. As a result, all measurements undertaken by the sensor are more reliable, efficient, and accurate.

DETAILED DESCRIPTION

The present invention will now be described with reference to the Figures. While the following description is directed to transformers, other electrical devices, such as voltage regulators or capacitors, are contemplated as being able to take advantage of the instant invention.

Figure 1:
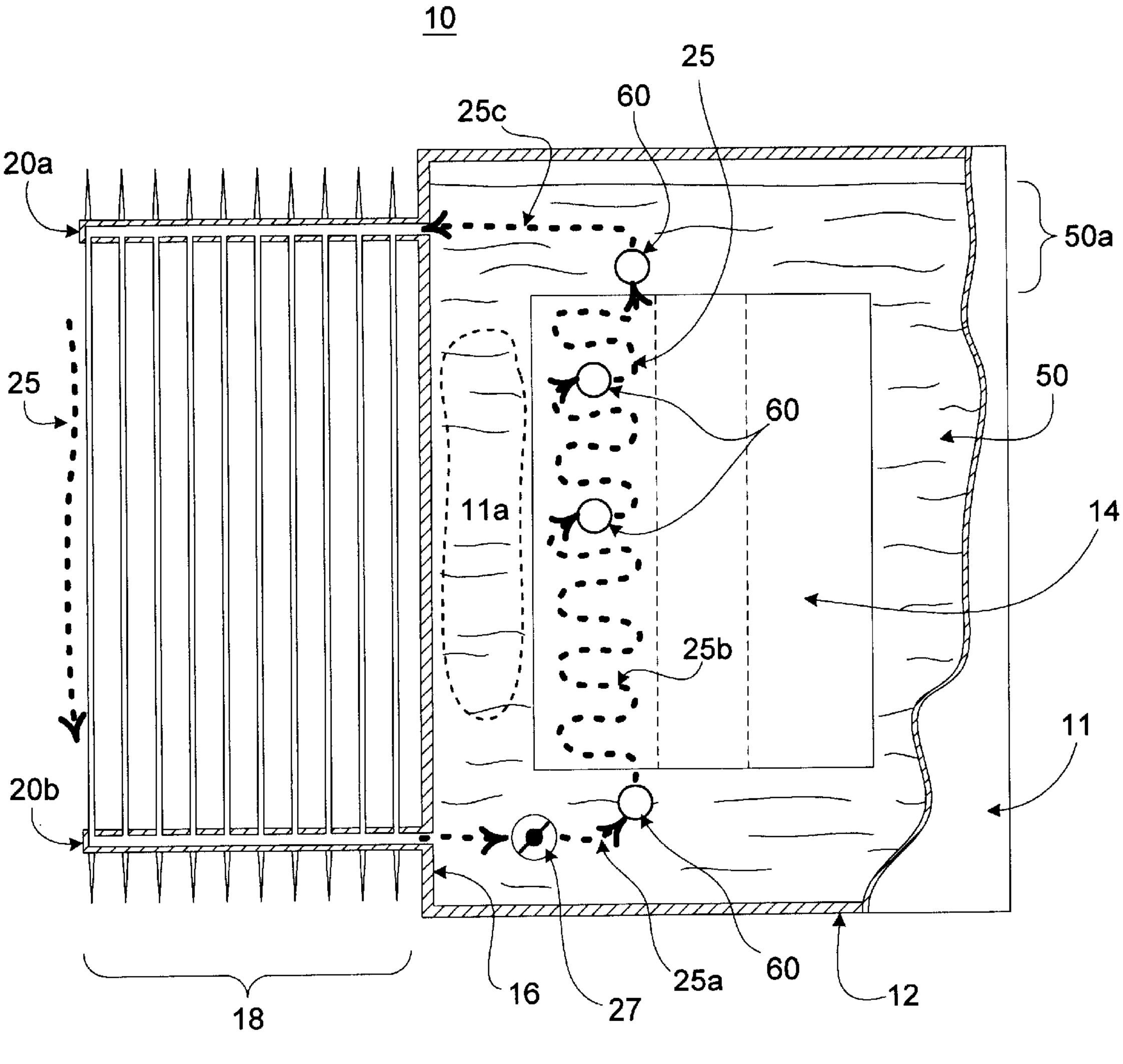
FIG. 1 depicts a fluid circulation flow path of an electrical transformer including locations for sensors.

FIG. 1 depicts a transformer 10 including a tank 11 having a tank base 12 and tank wall 16. The tank 11 is filled with a fluid 50, preferably oil, which provides the cooling and insulative properties desired for such an electrical device. Also shown schematically inside the tank 11 is the primary/secondary windings 14. For simplicity, the electrical connections from the primary/secondary windings 14 to the outside of tank 11 are not shown. For additional cooling purposes, a radiator set 18 is provided external to the tank 11 and is connected to the tank via top and bottom headers 20*a*, 20*b*, respectively.

In accordance with FIG. 1, a circulation flow path 25 is defined within the transformer 10. There are two main types of circulation flow in transformers. One type is forced convection flow which uses a pump to push the oil through the windings 14, or coils, and radiator set 18. Radiator 18 is used as an example, but any heat exchanging apparatus is operable with the teachings of the instant invention. The other type of circulation flow is natural convection flow which relies on changes in fluid density to naturally force circulation flow. In accordance with a preferred embodiment, the circulation flow path 25 for the forced convection type can be defined by starting at a pump 27 and moving towards a flow channel 25*a* to the primary/secondary windings 14. The windings 14 preferably are wound with key spacers (not shown) which direct the flow through the windings 14 in a reciprocating pattern. That is, the windings 14 in combination with the key spacers result in zig-zag like flow channels 25*b*. After leaving the windings 14, the fluid 50 moves to the radiator set 18 through a flow channel 25*c* . Once the fluid 50 enters the top header 20*a*, it is directed to flow through individual panels of the radiator set 18 and then into the bottom header 20*b*. After the fluid 50 exits the bottom header 20*b*, it returns to the pump 27 and circulation repeats.

For the natural convection case, the flow path is somewhat less definitive in certain locations. In this case, the fluid 50 in the windings 14 heats up thereby forcing it to rise upward. Once the fluid 50 exits flow channels 25*b* defined by windings 14 and key spacers, the fluid 50 mixes together. At the top of the fluid level 50*a*, the fluid 50 enters the well-defined circulation flow path 25 including radiator set 18 and headers 20*a* , 20*b*. After leaving the bottom header 20*b* the fluid 50, by natural convection, reenters flow channels 25*b* in the windings 14 to repeat the process.

In either the forced flow or natural convection type flow, there is a distinction between fluid 50 circulating in a defined circulation flow path 25 and comparatively stagnant fluid 50 outside the circulation flow path 25. For example, the fluid 50 in a region 11*a* of tank 11 does not have the same kinetic energy that the fluid 50 within flow channels 25*b* has. This kinetic energy exists as a result of pumping action in the forced convection flow type and/or as a result of natural convection currents.

The circulation flow path may also be thought of, generally, as a conservative closed loop wherein once the loop is traversed a first time, the measurement of fluid characteristics or properties in a second or subsequent pass does not yield appreciably different results unless the fluid properties have changed in the interim.

The circulation flow path may also be defined with respect to fluid velocity. Moving fluid in the circulation flow path typically has the property that the greatest velocity is present at the center of the circulation flow path and decreasing velocities are present at increased distances taken perpendicularly to the direction of flow. The circulation flow path boundary, i.e., the point where fluid in the flow path ends and stagnant fluid begins, is defined as the location at which fluid is flowing at about one tenth or 10% of the maximum velocity present at the center of the flow path.

Similarly, the circulation flow path can be defined with respect to fluid density. Streaming fluid with the lowest density typically will be coincident with the fluid having the highest velocity. As such, the distribution of densities measured across the circulation flow path is similar to the distribution of velocities. Temperature of the fluid is also interrelated. Generally speaking, the highest temperature is coincident with the lowest density which, in turn, is coincident with the largest velocity.

In many fluid filled electrical devices, such as electrical transformers, the fluid in the circulation flow path comprises only a fraction of the entire amount of fluid present in the device. This fraction can be calculated by determining the mass of fluid in the circulation flow path versus the mass of all fluid in the device. The mass of the fluid in the circulation flow path can be calculated by multiplying the average density of the fluid, $\rho_{average}$, times the cross sectional area of the circulation flow path (based on the 10% boundary factor discussed above) times the length of the flow path. Of course, the values of these variables depend on the particular type and size of device.

As noted previously, conventional transformer monitoring schemes rely on measuring the properties and characteristics of fluid 50 that typically resides, for example, near the tank wall 16, since measuring is performed on fluid that is adjacent to existing access holes or even a specially provided hole in the tank wall. As such, the fluid tested is outside the circulation flow path and, accordingly, the results obtained are not as reliable.

As shown in FIG. 1, on the other hand, sensors 60 are positioned in a variety of locations, each location being within the well-defined circulation flow path 25 of the transformer 10, whereby an observable event in the circulation flow path 25 can be more accurately, reliably, and efficiently monitored and/or sensed.

Figure 2:
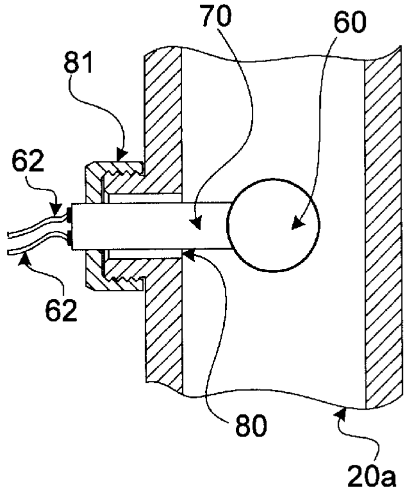
FIG. 2 depicts a sensor mounted on the end of a feedthrough disposed in a radiator header.

The sensors 60 can be mounted physically in many different ways depending on where they are located. Some preferred ways for mounting the sensors 60 in the circulation flow path 25 include, as shown in FIG. 2, tapping a hole 80 in, for example, the top header 20*a* and welding a nipple 81 over the hole 80. The sensor 60 is mounted at the end of a feedthrough 70 which is preferably screwed into or on the welded-on nipple 81. In this case, the wires 62 for the sensor 60 remain external to the tank 11. It is noted that a hole with the described nipple could also be made in a panel of the radiator set 18 or the bottom header 20*b* as well. The feedthrough 70 preferably is sufficiently long such that the sensor on the end thereof is positioned within the circulation flow path 25. The wires 62 preferably are connected to a processor 65 for processing the output of the sensor 60. Processor 65 preferably is capable of storing the output of the sensor (or multiple sensors) and determining whether that output exceeds a predetermined threshold, thereby indicating an imminent or actual fault condition.

Processor 65 preferably is also capable of analyzing the outputs of a plurality of sensors both with respect to relative sensor output magnitude and relative and absolute time between readings. Such data preferably is used to analyze an observable event over a particular time period resulting in even more accurate and useful data regarding the state of the transformer.

Figure 3:
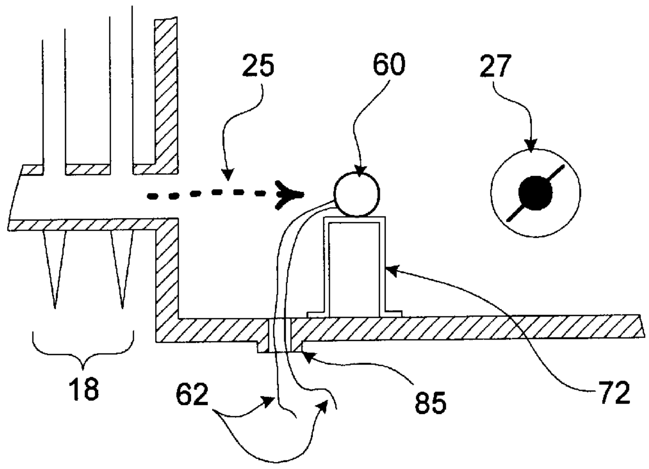
FIG. 3. depicts a sensor mounted on a bracket inside the tank of a transformer.

Another preferable way to mount a sensor 60 in the circulation flow path 25 is via a bracket inside the tank 11 adjacent an inlet to or an outlet from the top or bottom header 20*a*, 20*b*, respectively. FIG. 3 depicts a U-bracket 72 with a sensor 60 mounted on the top thereof. The bracket 72 is of a height and position relative to the header outlet (in the case shown) such that the sensor 60 is positioned within the circulation flow path 25 of the transformer 10. In this case the wires 62 are internal to the tank and, accordingly, must be brought out through a feedthrough 85. Of course, such a feedthrough 85 preferably maintains a fluid tight seal and maintains pressure within the tank 11. Feedthrough 85 is therefore preferably either welded or bolted to the tank wall 16 or base 12 or cover (not shown) of the tank 11. In either case the mounting provision can allow for replacement of the sensor by removing the top or bottom header 20*a*, 20*b*, as appropriate, to obtain access to the sensor 60. While the earlier-described externally-mounted feedthrough 70 with a sensor on the end thereof (FIG. 2) is relatively easier to replace under field conditions, the just-described internally-mounted sensor has the advantage of avoiding the necessity of providing additional access holes through the tank walls 16.

In another embodiment of the present invention, a sensor preferably is mounted in close proximity to the primary/secondary windings 14. Such positioning is desirable as many fault conditions stem from this portion of a transformer. FIG. 1 schematically illustrates sensors 60 that are wound with the windings 14 themselves, preferably during winding manufacture. While such positioning of the sensors is desirable due to the proximity of potential observable events, this approach can pose certain problems. For example, the sensor and associated wires preferably are insulated electrically from the winding conductors, but the sensor or wires may be destroyed by shearing or abrasion during manufacturing, shipping, or operation. This may lead to other physical phenomena which greatly affect the location and mechanism of sensor mounting in the windings 14.

A transformer operates by linking magnetic field lines between primary and secondary coils. And, the intensity of the linkage magnetic field is generally large enough such that electrical noise can be generated in the wires of the sensor. Unfortunately, the noise level can be larger than the normal signal level produced by the sensor thereby rendering the sensor practically unusable. To alleviate this problem, shielded cable preferably is implemented for the sensor wires.

Additionally, the magnetic field generated by the windings 14 induces voltage in the windings 14. The induced voltage levels are typically sufficiently large such that capacitive coupling between the windings and the sensor results, thereby elevating the voltage level of the sensor above ground. This problem preferably is overcome by implementing electronic capacitance decoupling. Again, while having a sensor located within the circulation flow path with the primary and/or secondary windings is desirable, this approach can become more expensive compared to the other embodiments described herein.

Figure 4:
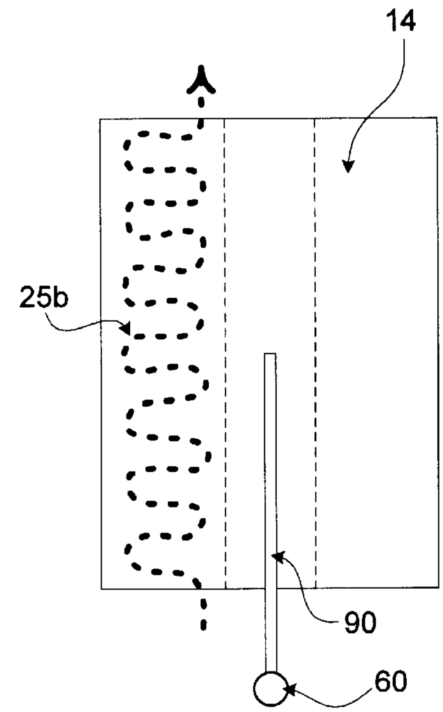
FIG. 4 depicts a sensor on an end of a probe whose other end is disposed within the windings of a transformer.

Yet another sensor positioning site, as shown in FIG. 4, is on one end of a probe 90, where the other end of the probe is positioned within the windings 14. In this embodiment, the fluid 50 in the windings 14 preferably is extracted via the probe and passed to the sensor 60 that is outside the windings 14. This approach greatly reduces the magnetic and electric field constraints described above with respect to sensors disposed within the windings 14.

In still another embodiment of the present invention, a sensor 60 preferably is mounted a small distance away from either the entrance or exit of the winding flow channel 25*b*, as shown in FIG. 1. Such an approach allows for the sensor 60 to be in the circulation flow path 25 and achieves reduced sensor susceptibility to electric/magnetic interference.

The sensors 60 operable with the teachings of the present invention are not limited in any way. That is, in accordance with the present invention, any known sensor can be positioned in a circulation flow path of a transformer or any other type of electrical device that includes cooling and/or insulating fluid. Operable with the present invention are temperature sensors, gas concentration sensors, which sense gases that are soluble in oil (e.g. hydrogen, methane, ethane, ethylene, carbon monoxide and carbon dioxide, acetylene, propane, propylene), moisture sensors, dielectric strength sensors, and power factor sensors. The foregoing list is intended to be exemplary only and in no way limit the type of sensor that could be implemented in the present invention.

In accordance with the embodiments described herein, it is possible to more accurately and effectively monitor an observable event that might occur in a transformer or any fluid-filled electrical device. By positioning at least one sensor in the fluid circulation flow path of the transformer, a faster and more representative indication of an observable event can be obtained.

While specific embodiments have been described, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the invention, but that the invention will include all embodiments falling within the scope of the appended claims.

What is claimed is:

1. A fluid filled electrical device comprising:

a tank containing portions of the electrical device;

a fluid substantially contained in said tank, said fluid having a maximum velocity;

heat exchanging means in fluid communication with said tank for cooling said fluid;

a portion of said fluid having a velocity greater than or equal to 10% of said maximum velocity defining a fluid circulation flow path, portions of said fluid circulation flow path being located in at least part of said heat exchanging means and said tank; and at least one diagnostic sensor disposed in said fluid circulation flow path and within said heat exchanging means.

2. The electrical device of claim 1, wherein said at least one diagnostic sensor is attached through a nipple connection.

3. The electrical device of claim 1, wherein said heat exchanging means further comprises a top header and a bottom header and portions of said fluid circulation flow path are located in said top header and said bottom header.

4. The electrical device of claim 1, further comprising a feedthrough having said at least one diagnostic sensor connected thereto on one end thereof and being connected at the other end thereof to said heat exchanging means.

5. The electrical device of claim 1, wherein said at least one diagnostic sensor is one of a temperature sensor, a gas concentration sensor, a moisture sensor, a dielectric strength sensor, or a power factor sensor.

6. The electrical device of claim 1, wherein a plurality of diagnostic sensors are disposed in said fluid circulation flow path.

7. The electrical device of claim 1, wherein said circulation flow path is defined by at least one of a forced fluid flow or a natural convection fluid flow.

8. The electrical device of claim 1, wherein said fluid comprises oil.

9. The electrical device of claim 1, wherein the electrical device is one of an electrical transformer, a voltage regulator, or a capacitor.

10. The electrical device of claim 1, wherein said heat exchanging means is one of a radiator or a heat exchanger.

11. The electrical device of claim 1, further comprising a processor connected to said at least one diagnostic sensor.

12. The electrical device of claim 11, wherein said processor analyzes at least one of a magnitude of an output of said at least one sensor and a time associated with said output.

13. The electrical device of claim 1, wherein said circulation flow path is a conservative closed loop.

14. An electrical transformer comprising:

a tank containing portions of the electrical transformer;

oil substantially contained in said tank, said oil having a maximum velocity;

heat exchanging means in fluid communication with said tank for cooling said oil;

a portion of said oil having a velocity greater than or equal to 10% of said maximum velocity defining a fluid circulation flow path, portions of said fluid circulation flow path being located in at least part of said heat exchanging means and said tank; and a plurality of diagnostic sensors disposed in said fluid circulation flow path.

15. The electrical transformer of claim 14, wherein at least one of said diagnostic sensors is disposed within said heat exchanging means.

16. The electrical transformer of claim 14, further comprising a processor connected to said plurality of diagnostic sensors, said processor adapted to analyze a magnitude of an output of said plurality of diagnostic sensors and a time associated with said output.

17. A fluid filled electrical device comprising:

a tank containing portions of the electrical device;

a fluid substantially contained in said tank, said fluid having a maximum density;

heat exchanging means in fluid communication with said tank for cooling said fluid;

a portion of said fluid having a density less than or equal to 90% of said maximum density defining a fluid circulation flow path, portions of said fluid circulation flow path being located in at least part of said heat exchanging means and said tank; and at least one diagnostic sensor disposed in said fluid circulation flow path and within said heat exchanging means.

18. The electrical device of claim 17, wherein said heat exchanging means further comprises a top header and a bottom header and portions of said fluid circulation flow path are located in said top header and said bottom header.

19. The electrical device of claim 17, further comprising a feedthrough having said at least one diagnostic sensor connected thereto on one end thereof and being connected at the other end thereof to said heat exchanging means.

20. The electrical device of claim 17, wherein said at least one diagnostic sensor is one of a temperature sensor, a gas concentration sensor, a moisture sensor, a dielectric strength sensor, or a power factor sensor.

21. The electrical device of claim 17, wherein a plurality of diagnostic sensors are disposed in said fluid circulation flow path.

22. The electrical device of claim 17, wherein said circulation flow path is defined by at least one of a forced fluid flow or a natural convection fluid flow.

23. The electrical device of claim 17, wherein said fluid comprises oil.

24. The electrical device of claim 17, wherein the electrical device is one of an electrical transformer, a voltage regulator, or a capacitor.

25. The electrical device of claim 17, wherein said heat exchanging means is one of a radiator or a heat exchanger.

26. The electrical device of claim 17, further comprising a processor connected to said at least one diagnostic sensor.

27. The electrical device of claim 26, wherein said processor analyzes at least one of a magnitude of an output of said at least one sensor and a time associated with said output.

28. The electrical device of claim 17, wherein said circulation flow path is a conservative closed loop.

29. The electrical device of claim 17, wherein said at least one diagnostic sensor is attached through a nipple connection.

30. An electrical transformer comprising:

a tank containing portions of the electrical transformer;

oil substantially contained in said tank, said oil having a maximum density;

heat exchanging means in fluid communication with said tank for cooling said oil;

a portion of said oil having a density less than or equal to 90% of said maximum density defining a fluid circulation flow path, portions of said fluid circulation flow path being located in at least part of said heat exchanging means and said tank; and a plurality of diagnostic sensors disposed in said fluid circulation flow path.

31. The electrical transformer of claim 30, wherein at least one of said diagnostic sensors is disposed within said heat exchanging means.

32. The electrical transformer of claim 30, further comprising a processor connected to said plurality of diagnostic sensors, said processor adapted to analyze a magnitude of an output of said plurality of diagnostic sensors and a time associated with said output.

* * * * *